United States Patent [19]

Edwards

[11] 4,010,052
[45] Mar. 1, 1977

[54] MOLDING VALVE STEMS TO RUBBER ARTICLE

[75] Inventor: Charles E. Edwards, Muscatine, Iowa

[73] Assignee: Bandag Incorporated, Muscatine, Iowa

[22] Filed: Sept. 24, 1974

[21] Appl. No.: 508,995

[52] U.S. Cl. .............................. 156/120; 152/429; 264/275
[51] Int. Cl.² ......................................... B29H 15/06
[58] Field of Search ....... 156/120, 293, 294, 303.1; 264/155, 271, 275; 152/429

[56] References Cited
UNITED STATES PATENTS

| | | | |
|---|---|---|---|
| 1,218,779 | 3/1917 | Crate | 264/271 X |
| 2,666,007 | 1/1954 | Hovey | 156/120 |
| 3,017,308 | 1/1962 | Pond | 156/120 |
| 3,069,303 | 12/1962 | Scholle | 156/120 X |
| 3,355,340 | 11/1967 | Calvert et al. | 156/120 X |

Primary Examiner—Charles E. Van Horn
Assistant Examiner—John E. Kittle
Attorney, Agent, or Firm—Cushman, Darby & Cushman

[57] ABSTRACT

A method of bonding a valve stem assembly adapted to a rubber sheet which includes the steps of inserting the stem in a concave mold, surrounding one end of the stem with an uncured rubber ring, inserting a removable plug in the core of the stem, placing an imperforate rubber sheet over the plugged end of the stem, and applying heat and pressure to the assembly so as to mold the ring and sheet around the end of the stem. The plug is then pushed out of the core of the stem.

10 Claims, 4 Drawing Figures

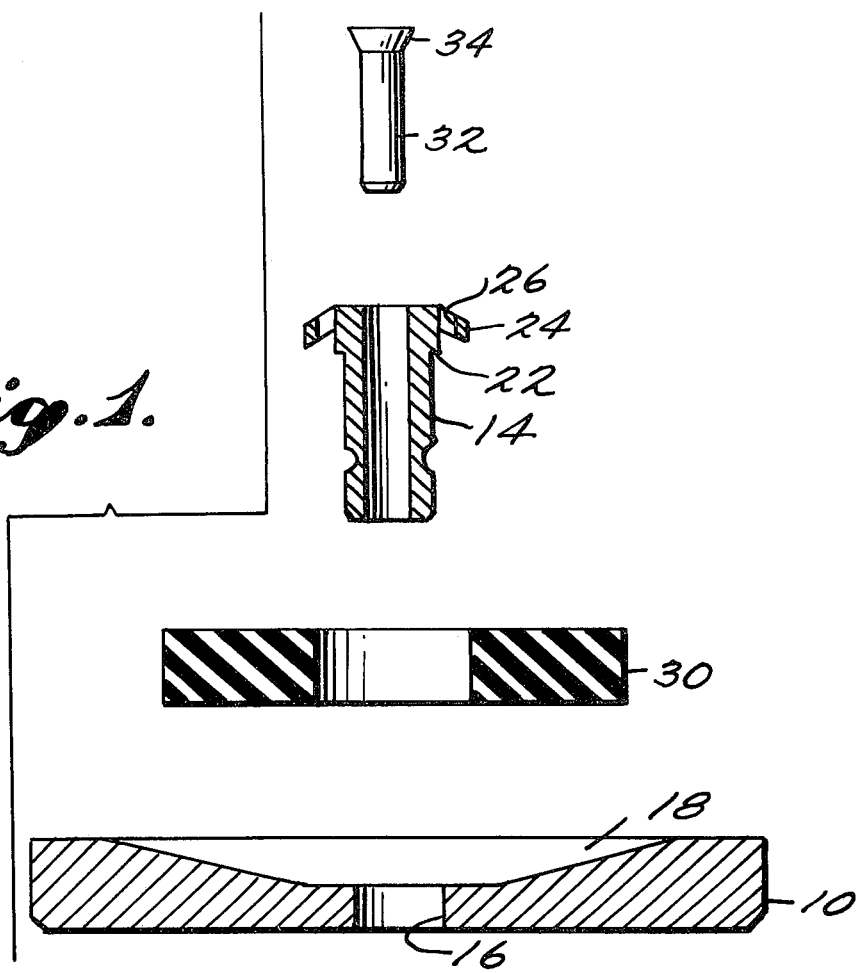
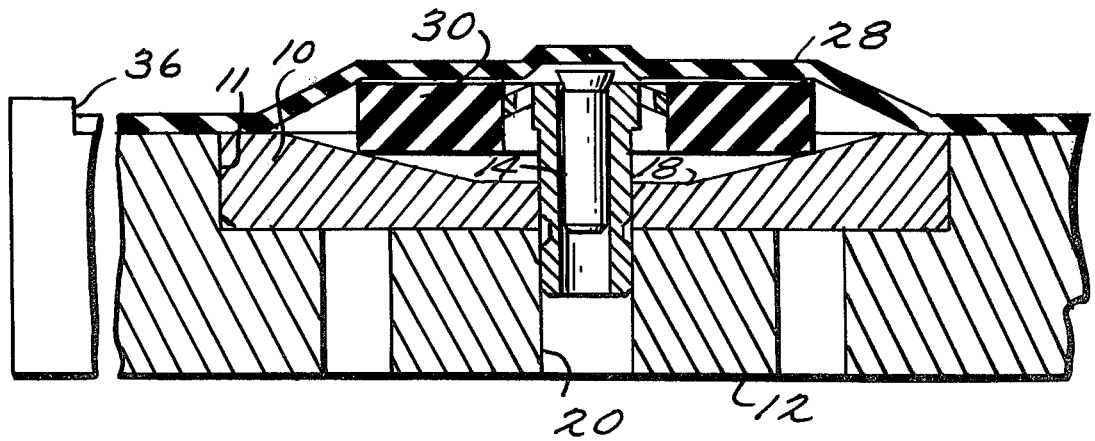

MOLDING VALVE STEMS TO RUBBER ARTICLE

BACKGROUND OF THE INVENTION

This invention relates to bonding valve stems to molded rubber articles such as inflatable products, toys, and in particular envelopes employed in certain types of tire retreading processes.

Numerous procedures have been suggested for attaching valve stems to rubber articles such as inner tubes, bladders, and the like. Sometimes, however, because of imperfect bonding a leakage between the valve stem and its seal with the rubber article destroys the value of the finished article. Typical of the prior art devices or procedures are shown in the U.S. Pat. Nos. to Mincher 1,671,306, Broecker 2,106,673, and Becker 2,143,837. These prior art patents disclose various techniques for either attaching a rubber disc to the valve stem and then attaching the resulting composite structure to the rubber article or attempting to vulcanize a valve stem and disc together with the rubber article in a single operation wherein the opening in the valve stem is aligned with an opening in the rubber article. These prior art teachings require precision alignment of the various elements being assembled prior to curing and some errors result in less secure bonding so that leaks occur from time to time in the finished product. Also, the passageway through the valve stem may become partially blocked during the curing process. Of more general interest are the U.S. Pat. Nos. to Bourdon 2,495,955 and Pratt 3,247,882. In all these prior art teachings the stem is assembled with the article by lining up the passage through the stem with an aperture in the article.

The present invention is an improvement over these teachings in providing a method for simultaneously vulcanizing the stem and the rubber article together in the presence of an uncured valve base material. A mold assembly is provided including a main mold adapted to receive a valve stem mold and the article, the latter being generally in the form of a sheet. In such an assembly, the valve stem with a removable plug is inserted into an uncured rubber ring and then fitted into the valve stem mold which has a suitable molding chamber for receiving the stem and the uncured rubber ring in a manner such that the plugged end of the valve stem will be nearly flush with the mold cover. This assembly of the valve stem and ring in the mold, including the plug is then completely covered with a portion of the uncured rubber article and the entire assembly is pressed under curing conditions in the main mold so that the stem is bonded to the article by simultaneous curing of the ring and the article. After this curing process has taken place, the plug which was inserted in the end of the valve opening is pushed clear of the passageway through the valve stem, and as it is pushed clear it shears away a small portion or circular plug of the cured article material. The separated plug of cured material and the plug may be disposed of so that the passageway through the valve stem is fully opened to the opposite side of the article.

It is therefore an object of this invention to provide an improved curing method for attaching valve stems to rubber articles and more particularly for attaching metal valve stems to a rubber sheet during vulcanization of the rubber sheet.

It is another object of this invention to provide an improved assembly and curing procedure for assembling a metal valve stem with a rubber article to produce a leak-proof seal between the stem and article while insuring a clear valve stem passage in the final product.

IN THE DRAWINGS

FIG. 1 is an exploded sectional view of a valve stem, uncured base material and plug elements showing their relationship for assembly in a valve stem mold;

FIG. 2 is a sectional view a main mold assembly showing the valve stem mold, the valve stem, the valve base material and the plug assembly positioned in the main mold, with the uncured rubber article material overlying the valve stem assembly;

DETAILED DESCRIPTION OF THE INVENTION

Figure 3:
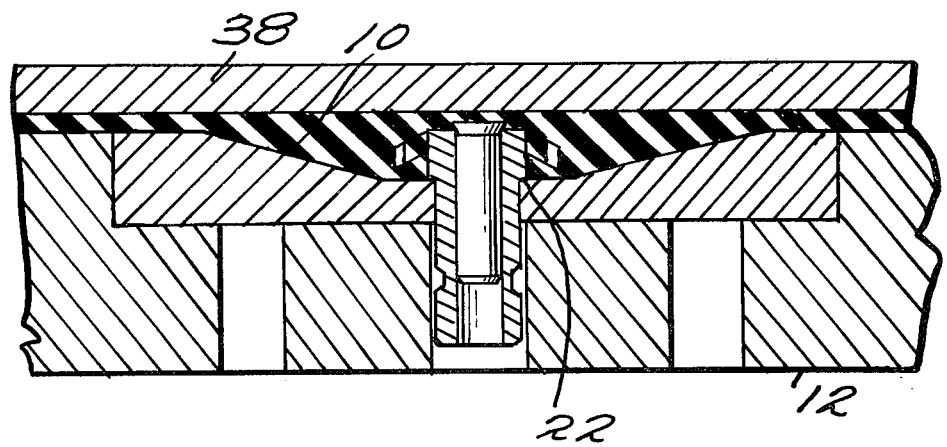
FIG. 3 is a sectional elevation through the main mold assembly of FIG. 2 after the rubber article and valve base material curing operation has taken place.

To begin the process a suitable mold is provided to receive a valve stem, an uncured base material and an uncured rubber article to be cured together. In the preferred procedure, a valve stem mold 10 in the form of a circular steel plate is adapted to be carried in a complementary cavity 11 in a main mold 12. And, as shown in FIG. 1, a valve stem 14 is adapted to be inserted in the valve stem mold 12 by loosely fitting the stem into an aperture 16 at the bottom of an upwardly facing concave chamber 18 in the main mold 10. The aperature 16 is aligned with an aperature 20 in the main mold 12 so that the end of the valve stem 14 can extend downwardly from the valve stem mold 10, and other aperatures are provided in the main mold 12 to allow trapped air to escape as the valve stem mold 10 is fitted into the main mold 11. The valve stem 14 has a circular shoulder 22 defining the end of the stem to be exposed in the chamber 18, the shoulder 22 being adapted to engage against the upper periphery of the aperture 16 during molding to hold the valve stem spaced properly in the chamber 18. The valve stem 14, is also provided with a flared flange 24 having a plurality of aperatures 26 therein which serve to interlock the valve stem 14 with the finished product as the curing process proceeds.

In the illustrated embodiment a brass valve stem 14 is shown being bonded to a rubber sheet 28 which may be for example an envelope used for covering the periphery of a tire casing and tread strip assembly during a tire retreading operation, as disclosed in U.S. Pat. No. 3,236,709. As shown the stem 14 is inserted into an uncured rubber ring 30 with a slight friction fit existing between the flange 24 and the ring 30. The metal plug 32 is inserted into the upper end of the stem 14, and the resulting assembly is placed in the valve stem mold 10 which has previously been placed in the cavity 11 in the main mold 12. The upper end of the plug 32 is provided with a flare 34 which forms a seat to hold the plug 32 at the top end of the passage in the valve stem 14. After the assembly of the valve stem 14, uncured rubber ring 30 and plug 32 in the molds 10 and 12, the rubber sheet 28 in uncured form is applied over the assembly so as to lie within a cavity 36 in the main mold 12, as illustrated in FIG. 2.

After the uncured rubber sheet 28 has been properly fitted into the main mold 12, a mold closure member 38, which is complementary to the cavity 36, is applied and the entire assembly is subjected to pressure and curing conditions to simultaneously cure the sheet material and the uncured ring 30 which are caused to flow together in the chamber 18 to produce the integrated structure shown in FIG. 3. Chamber 18 is designed to have the right volume to accommodate the volume of the valve stem 14, the flange 24 and the rubber ring 30 which flows into apertures 26 of flange 24 and throughout the chamber 18. The uncured sheet 28 which is shown in the assembly represented in FIG. 2 is preferably cured to fall into a straight line condition across the top of the flared end 34 of the plug 32, as shown in FIG. 3, so that the exposed flared end of the plug 32 is embedded under the surface of the cured sheet 28. Any air trapped in the chamber 18 during assembly of the parts as shown in FIG. 2 is easily expelled downwardly and out aperture 16 as the material flows during the curing process.

Upon application of curing heat and pressure by the closure 38, the shoulder 22 is pushed downwardly to engage against the valve stem mold 10 to position the upper end of the plug 32 just under the surface of the sheet 28 so that all portions of the sides and the exposed end of the valve stem 14 and the exposed top of plug 32 are simultaneously bonded within the rubber ring 30 together with the sheet 28 to produce a unitary structure. The rubber material flowing into the apertures 24 during the curing process produces an interlocking arrangement to further secure the valve stem 14 in the fully cured structure.

Figure 4:
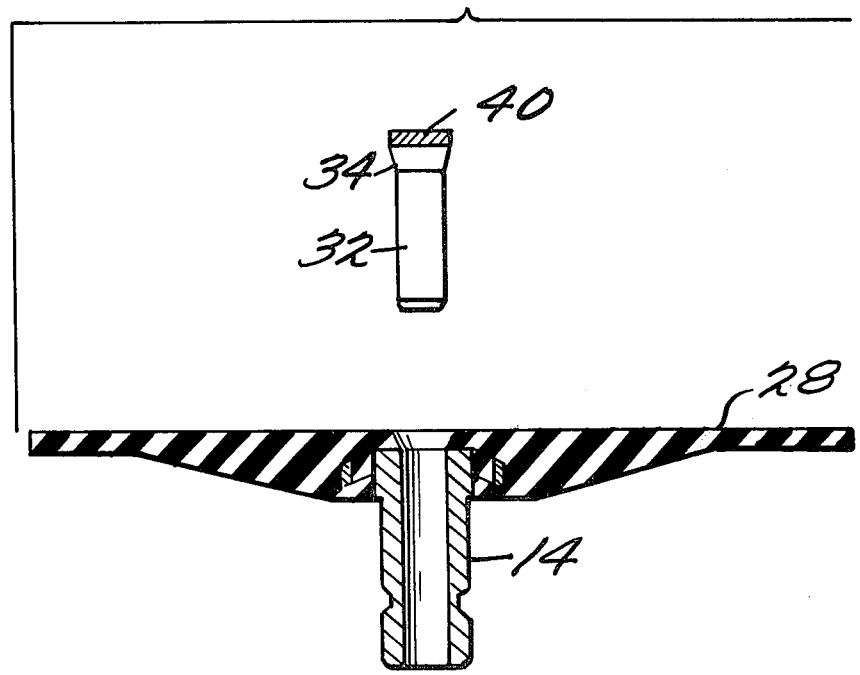
FIG. 4 is a fragmentary sectional view illustrating the removal of the plug from the valve stem after curing has been completed to clear the passageway through the valve stem.

After the assembly has been cured by proper processing the intermediate product is as shown in FIG. 3, whereupon the now cured sheet 28 and the bonded-in valve stem 14 may be removed from the main mold 12 and the valve stem mold 10 is removed from the valve stem 14. Thereafter, the plug 32 is pushed from the valve stem 14 as shown in FIG. 4 to separate the plug 32 from the valve stem 14 and remove a circular portion 40 of the cured sheet material from the the remainder of the cured sheet 28. The portion 40 is substantially circular and if desired, the plug 32 can be located above a cooperating shearing mold, not shown, so that the portion 40 can be neatly separated from the remainder of the cured sheet material by pressing the plug 32 upwardly as indicated in FIG. 4.

In some instances, to encourage a more sure bonding of valve stem 14 to the sheet 28, it may be desirable to coat the exposed end of the valve stem 14 above the shoulder 22 with an uncured cement which will further tend to integrate the valve stem structure with the uncured rubber material of the ring 30 and the sheet 28 as the curing action proceeds.

For most industrial applications, the valve stem 14 is preferably made of brass or other metal and should be properly degreased prior to use in this process, and preferably the portion of the stem to be bonded to the sheet 28 is etched as is well known, to condition the metal for better attachment to the rubber as the latter is cured.

After the valve stem 14 has been properly degreased and etched, if it is desired to use a cement, the cement should be applied immediately after the etching process and the stem 14 should be inserted in the valve stem mold 10 promptly so that the vulcanizing or other curing procedure can take place without undue exposure of the uncured material to the atmosphere.

The curing of the sheet 28 and the ring 30, and cement if it is used, is accomplished in a one-step vulcanization or curing operation to enhance the integration of the material and bonding the base material, the valve stem and the envelope into a unitary structure. The presence of the plug 32 in the exposed upper end of the valve stem 14 precludes the entry of any flowable material into the valve stem 14 during the curing procedure, and upon completion of the curing, the removal of the valve stem plug 32 causes the small piece 40 of sheet material to be removed from the end of the passageway from the valve stem 14 whereby a more complete attachment of the flange and valve stem to the sheet 28 is accomplished while preserving an unobstructed valve stem passage.

This procedure can be used for the manufacture of various types of molded goods from uncured rubber, or other plastic materials where an open passageway is desired through a stem leading to the opposite sides of a cured final product such as inflatable toys, inner tubes, tires, or other shapes of the kind which can be produced by welding the edges of the cured sheet together as is well known to produce a closed product. Valve stems attached to rubber envelopes used in tire retreading operations by the preferred technique have been found to have a prolonged life at temperature stresses within the range of 205° to 210° F. as well as improved performance and a cost saving in the production of a finished article.

While the above describes the preferred form of the invention, it is possible that modifications thereof may occur to those skilled in the art which will fall within the scope of the following claims.

What is claimed is:

1. A method of attaching a valve stem having a passageway therethrough to a curable rubber article comprising inserting a valve stem in a mold plate having a chamber therein, setting the stem and plate in a main mold leaving a portion of one end of the stem exposed in said chamber, inserting a valve stem plug in the passageway at the exposed end of the valve stem, surrounding the exposed end of the valve stem in the chamber of the mold plate with a ring of uncured valve base material, placing an uncured rubber article in the main mold and covering the plugged exposed end of the valve stem and the valve base material with the uncured rubber article, applying pressure and curing the rubber article and the valve base material simultaneously in the main mold and then pushing the plug entirely clear of said exposed end of the valve stem to separate a generally circular portion of the cured article material positioned over the plug from the remainder of the article to provide a unitary fully opened passageway through the valve stem.

2. A method as in claim 1 wherein the valve stem is a brass body, and including the steps of degreasing and etching the body, and covering the end of said body that will be said exposed end in said mold with a curable adhesive before the body is inserted in said mold plate.

3. A method as in claim 1 wherin the valve stem has a perforated flange forming a part of the end of the stem that will be said exposed end, flowing the valve base material into said perforations during the curing step whereby the stem, said base material and envelope become interlocked together during said curing step.

4. A method as in claim 2 wherein the brass body has a perforated flange on the end, covering said exposed end with a curable adhesive whereby the body, said base material and rubber article become interlocked together during said curing step.

5. A method as in claim 2 wherein said plug is a loosely fitted aluminum plug having a flared end to hold it positioned in the passageway at said exposed end and shearing the cured separable article material from the remainder of the cured article with the flared end of the plug when the plug is pushed from the valve stem body.

6. A method as in claim 5 wherein said body has a shoulder, pushing said body into the mold plate to engage said shoulder against the mold to limit its insertion into the mold plate whereby to locate the exposed flared end of said plug in said chamber just below the surface of the cured article material after the curing step.

7. A method as in claim 2 wherein the brass body has a perforated flange on the end, covering the exposed end with a curable adhesive, and said body also having a shoulder pushing said body into the mold plate to engage said shoulder against the mold to limit its insertion into the mold plate whereby to hold said exposed end and said flange located in said chamber with the flared end of the plug just below the surface of the cured article material after the curing step.

8. A method as in claim 2 wherein the brass body has a perforated flange on the end, covering the exposed end with a curable adhesive, said body also having a shoulder, pushing said body into the mold, the mold plate to engage said shoulder against the mold to limit its insertion into the mold plate, said plug being a loosely fitted aluminum plug having a flared end to hold it positioned in the passageway at said exposed end, the exposed flared end of said plug being located in said chamber just below the surface of the cured article material said plug preventing the flow of any article or valve base material into the passageway during the curing step, and shearing said separable portion of the cured material from the article when the plug is pushed from the valve stem after curing is complete.

9. A method of sealing a stem having a passageway therethrough in a wall of a curable rubber article comprising inserting a removable plug in the passageway in the stem and surrounding at least a portion of the length of the stem with a ring-shaped mass of uncured rubber, placing an imperforate portion of said wall of the curable rubber article over one end of said stem and over the adjacent face of said mass of uncured rubber, and heat-curing the wall and the mass of uncured rubber while pressing these elements toward each other whereby said one end of said stem becomes embedded in rubber, and moving said plug out of the stem through said one end thereby forming a hole through the rubber which overlies said one end.

10. A method as in claim 9 wherein said plug has an enlarged head disposed outside said one end of said stem thereby preventing movement of said plug completely into said stem.

* * * * *